United States Patent [19]
Keller et al.

[11] 3,850,695
[45] Nov. 26, 1974

[54] VOLTAGE REGULATOR SYSTEM FOR USE WITH FUEL CELL BATTERY

[75] Inventors: Helmut Keller, Reutlingen; Jürgen Bregler, Stuttgart; Helmut Rhein; Horst Jahnke, both of Gerlingen, all of Germany

[73] Assignee: Robert Bosch GmbH, Stuttgart, Germany

[22] Filed: Jan. 22, 1973

[21] Appl. No.: 325,541

[30] Foreign Application Priority Data
Feb. 5, 1972 Germany............................ 2205543

[52] U.S. Cl. .............................. 136/86 B, 318/139
[51] Int. Cl...................... H01m 27/00, H01m 31/04
[58] Field of Search.......... 136/86 B, 86 R; 318/139

[56] References Cited
UNITED STATES PATENTS 3,389,018   6/1968   Dowgiallo ......................... 136/86 B
3,697,325   10/1972  Baude ............................... 136/86 B
3,753,780   8/1973   Fetterman ......................... 136/86 B

*Primary Examiner*—Winston A. Douglas
*Assistant Examiner*—H. A. Feeley
*Attorney, Agent, or Firm*—William R. Woodward, Flynn & Frishauf

[57] ABSTRACT

Intermittent operation of a pump feeding fuel to the battery is controlled by circuits which produce pump operation cycles at intervals determined by energy used in the load circuit as well as additional cycles if the voltage falls below a fixed limit. Compensation for the drop in concentration of the fuel as the result of recirculation of partly spent fuel is provided by lengthening the pump operation cycles or making them more frequent with respect to power energy consumption in the load, or both.

21 Claims, 1 Drawing Figure

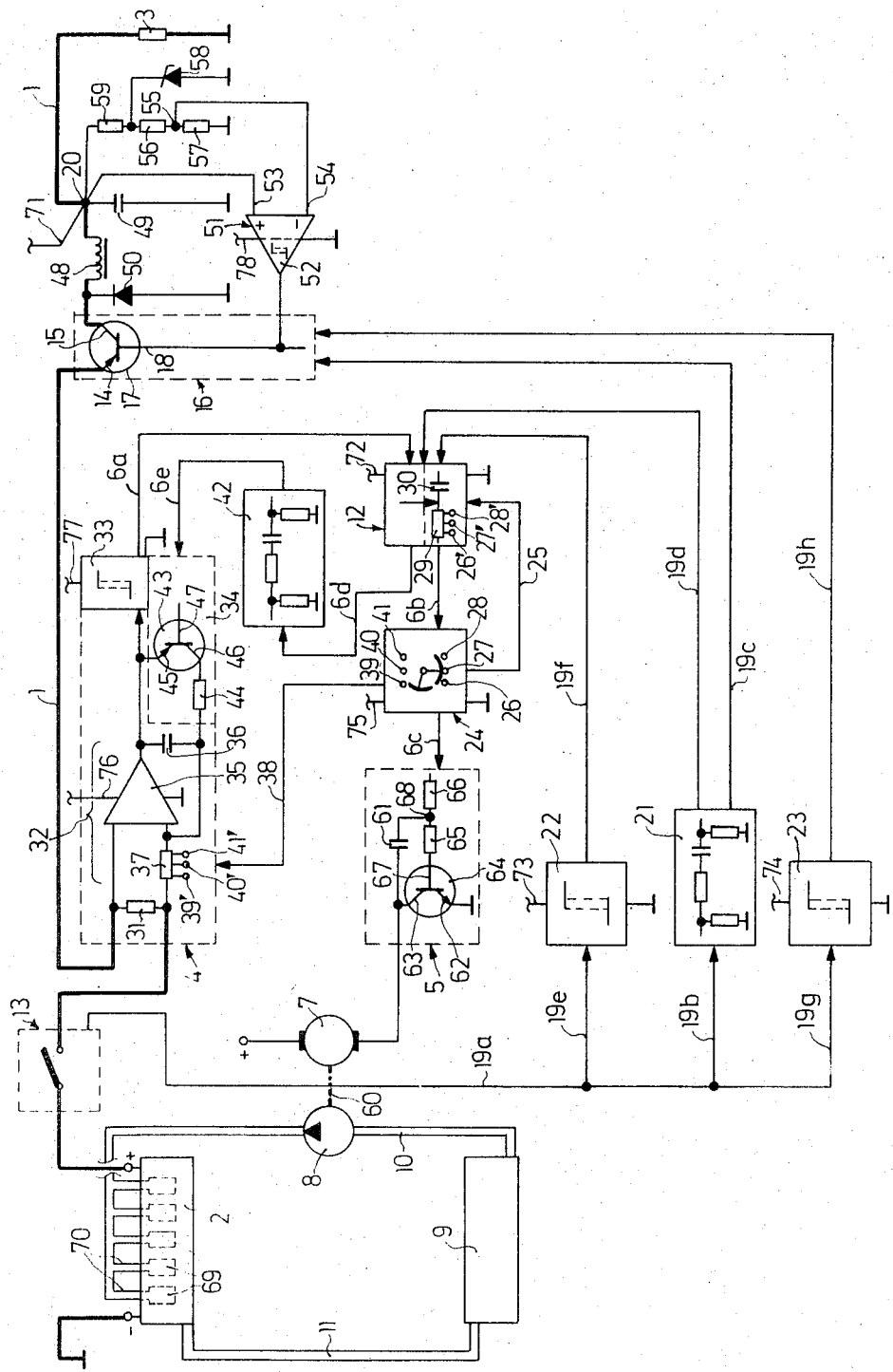

VOLTAGE REGULATOR SYSTEM FOR USE WITH FUEL CELL BATTERY

This invention relates to a voltage regulator system for a load circuit supplied by a fuel cell battery and more particularly a type of voltage regulator circuit adapted to control the operation of a pump for supplying fuel to the battery in accordance with the demands of the circuit so as to keep the voltage applied to the load at least approximately constant. By means of such a voltage regulator system, maintenance free operation of a fuel cell battery can be assured for a relatively long period.

The object of the invention is to provide a system of the type described above which can provide optimum conditions and reliability in the operation of equipment supplied by a fuel cell battery.

A BRIEF DESCRIPTION OF THE INVENTION

Briefly, in order to operate a pump to supply fuel as needed to the battery from a storage tank, the current of the load circuit is made to flow through an element of a monitoring circuit which will operate its output switch every time that a particular specific quantity of electricity has flowed through the load circuit. Each such switch operation, acting through a control circuit, produces a cycle of operation of the pump motor of such duration that a quantity of fuel approximately equivalent electro-chemically to the above-mentioned particular quantity of electricity is supplied to the battery. Furthermore, since it is practical to operate the fuel cell battery with recirculation of partly spent fuel, resulting in gradual reduction of the concentration of the fuel, a compensation arrangement is provided in the system so that after some previously set number of pump cycles a compensating adjustment will be made in the system, by increasing the duration of the individual pump cycles, or reducing the specific quantity of electricity the passage of which through the load triggers a pump cycle, or both. The system is also equipped with additional arrangements for coming into play when the load current is switched on and others that cut off the load current when the battery is no longer able to supply an adequate voltage.

Inductive and capacitive energy storage is helpful in the regulation operation and all of the active devices, which are conveniently all semiconductive devices, may be supplied with energizing voltage from the load side of the regulator system.

The invention will be described by way of example with reference to the accompanying drawing in which the single FIGURE is a schematic diagram of a regulator system according to the invention.

The load circuit 1 as shown in the drawing by a heavy line, starts at the positive terminal of a fuel cell battery 2, goes through the load 3, represented symbolically as an ohmic resistor, to the grounded negative terminal of the battery 2. Between the positive terminal of the battery 2 and the load 3 the load circuit passes through a monitoring circuit means 4 in which a switching operation of its output switch 33 is set off whenever a predetermined quantity of electricity has flowed through the load circuit. Operative connections 6a, 6b, 6c leading from the monitor circuit 4 to a control circuit means 5 temporarily switch on an electric motor 7, the energizing circuit of which passes through the control circuit 5, in response to the switching circuit in the monitor circuit 4.

Electric motor 7 is coupled with a pump 8 which is interposed in a feed line 10 leading from a fuel supply tank 9 to the fuel cell battery 2. The operation period of the pump, set off by the switching operation in the monitor circuit 4, supplies a quantity of fuel from the fuel supply tank 9 to the fuel cell battery 2 that is at least approximately equivalent electro-chemically to the previously mentioned predetermined quantity of electricity that flowed through the load circuit. Recirculation of partially spent fuel, which is desirable for economical operation, is provided by return line 11 leading from the fuel cell battery 2 to the fuel supply tank 9.

Interposed in the connection circuit 6a, 6b, 6c over which the monitoring circuit 4 is operatively associated with control circuit 5, is a monostable flipflop circuit 12 located between the connection 6a and the connection 6b. The flipflop 12 delivers a control pulse every time it is triggered by the switching operation of monitor circuit 4. Suitable choice of the duration of this control pulse determines the active period of the operation cycle of motor 7 and thus also the operative period of pump 8.

In the example illustrated in the drawing, the portion of the load circuit 1 leading from the fuel cell battery 2 to the monitor circuit 4 is provided with a main switch 13. The load circuit 1 after passing from the battery 2 over main switch 13 and through monitor circuit 4 then continues over the switching path 14–15 of an electrically controllable switch 16. In the example given this switching path 14–15 is provided by the emitter collector path of a pnp transistor, the conducting or non-conducting condition of which is dependent upon a control voltage operating on the control input 18 connected to the base electrode of transistor 17. When the system is put into operation by means of main switch 13 the necessary control voltage to establish a conducting condition in the switching path 14–15 is supplied over the connections 19a, 19b and 19c, whereas during operation this control voltage is picked off at junction point 20 which is located in the portion of load circuit 1 that leads from the switch 16 to the load 3.

The electrical connection 19a goes from main switch 3 to a branch connector 19b that leads to the input of a differentiating circuit 21, the output of which provides a control voltage to the control input 18 of electrically controllably switch 16 over the connection 19c. This control voltage switches the switching path 14–15 of switch 16 into its conducting condition.

In addition, the differentiator 21 has an output connection 19d that leads to the input of monostable flipflop 12 and serves to cause flipflop 12 to produce a control impulse as a result of the signal voltage at the output of differentiator 21 arising upon the closing of main switch 13. In response to this control pulse from flipflop 12 as already described, the pump 8 will be put into operation for the duration of the pulse.

For regulation of the voltage applied to the load circuit 1, a first voltage sensitive switch 22 is provided the input of which is supplied from main switch 13 over connection 19a and its branch 19e. The output of this first voltage sensitive switch 22 is connected over conductor 19f to the input of monostable flipflop 12. If the voltage under regulation falls below a fixed value in spite the operation of monitor circuit 4, first voltage sensitive switch 22 provides a signal at its output which is supplied over connection 19f to monostable flipflop 12 to cause the latter to provide a control pulse, by which the pump 8 will be put into operation for a timed period.

First voltage sensitive switch 22 may conveniently be provided in the form a Schmitt trigger circuit. The output signal that is used is the indication of the switching of the circuit that occurs when the voltage under regulation falls below an appropriately fixed value.

The voltage applied to load circuit 1 also governs another protective operation provided by means of a second voltage sensitive switch 23, the input of which is supplied from main switch 13 over connection 19a and its branch 19g. The output of second voltage sensitive switch 23 is supplied to electrically controllable switch 16 over the conductor 19h. If the voltage under regulation falls below a fixed value, the second voltage sensitive switch 23 then provides a signal at its output that will so affect control input 18 of switch 16 that the switching path 14–15 will be put into its non-conducting condition. It is desirable to provide the second voltage sensitive switch 23 also in the Schmitt trigger form. Here again the output signal used is the indication of the switching of the circuit that occurs when the voltage under regulation falls below the appropriately fixed value.

Both the first voltage sensitive switch 22 and also the second voltage sensitive 23 will be supplied with control voltage as soon as the main switch is closed. A regulating switch 24 is also interposed in the connections 6a, 6b and 6c leading from the monitoring circuit 4 to the control circuit 5. It is located between flipflop 12, to which it is connected by conductor 6b, and control 5, with which it is connected by conductor 6c. Regulator switch 24 is designed to operate after a particular number of pulses have been produced by flipflop 12. The operation of regulator switch 24 is designed to switch the circuits of the regulating system of this invention in such a way as to compensate for the reduction in concentration of the fuel by providing for the supply of a larger quantity of fuel.

For the regulating switch 24, it is appropriate to use a switching device combined with a digital counter having provisions for setting beforehand the number of pulses that it is necessary to count in order to bring about the switching operating in question.

The compensation for the reduction in fuel concentration by providing increased fuel feed can be produced in a simple way by providing from the output of regulating switch 24 a connection (25) back to flipflop 12 so arranged that a switching operating produced by regulating switch 24 will be each case increase the duration of the control pulses of monostable flipflop 12. Such a result can be obtained, for example, if, as symbolically indicated in the drawing, if for every switching operation of regulator switch 24 one of the switching paths related to switching terminals 26, 26, 28 etc. in this regulating switch should be open, while these switching terminals 26, 27, 28 etc. are respectively connected with several terminals 26', 27', 28' etc. of a resistor 29 in monostable flipflop 12 which determines the duration of the control pulses. In operation, then, a number of completed switching paths in regulating switch 24 is reduced by every switching operation of the regulating switch, thus reducing the number of short circuited sections of resistor 29. The time constant of the R-C combination of resistor 29 and a capacitor 30 will thus be increased by steps, and the duration of the unstable (temporary) condition of monostable flipflop 12 will likewise be extended in a stepwise manner, in each case providing a prolongation of the active period of pump 8.

Monitoring circuit 4 has a measuring resistor 31 which is connected in series in load circuit 1. The voltage arising across this measuring resistor 31 is supplied to an integration circuit 32. The switching operation produced by monitoring circuit 4 is preferably performed by a voltage sensitive switch in the form of a Schmitt trigger circuit connected to the output of integrator 32. Its operation is set off by the effect of a voltage produced by integrator 32 which varies with the result of integrating the voltage at the input of the integrator. To initiate this switching operation, the voltage applied to the voltage sensitive switch 33, varying with the integrated value in question, must reach a certain threshold value.

By appropriate choice of this threshold value, it is possible to specify with sufficient accuracy the quantity of electricity which must flow through measuring resistor 31, in each case, to initiate a switching operation of switch 33.

The monitoring circuit 4 also contains a reset circuit 34 for resetting to 0 or some other suitable initial condition the output of integrator 32 in response to the voltage-dependent operation of switch 33.

The integrator 32, in its preferred form, comprises an operational amplifier 35 with a feedback capacitor 36 connecting the output of this operational amplifier to its input and also, through at least one input resistor 37, to measuring resistor 31. The operational amplifier 35 functions so that the plate of feedback capacitor 36 connected with the output of operational amplifier 35 charges the capacitor plate connected to the input of the operational amplifier with positive (amplified) potential. This voltage on feedback capacitor 36 which is used to affect voltage sensitive switch 33 is proportionally dependent upon the amount of electricity which has flowed through measuring resistor 31.

Compensation for reduction of fuel concentration by means of increased fuel supply can also be provided, either instead of or in addition to the method already described by means of a connection 38 from regulating switch 24 back to monitoring circuit 4, so arranged that a switching operation of regulating switch 24 in each case reduces in suitable proportion the particular specific quantity of electricity on which the switching operation (of output switch 33) of monitoring circuit 4 depends. This can be provided if, as symbolically indicated on the drawing, each switching operation of regulating switch 24 closes one of the switching paths related to the switching terminals 39, 40, 41 etc. in this regulating switch, these switching terminals 39, 40, 41 etc. being respectively connected to several taps 39', 40', 41' etc. provided on input resistor 37. Each switching operation of regulator switch 24 will then increase the number of closed switching paths and thus also the number of short circuited sections of input resistor 37. In that fashion, the particular specific quantity of electricity which must flow through measuring resistor 31 in order to provide on feedback capacitor 36 a sufficient voltage to cause a switching operation of voltage sensitive switch 33 is subjected to a stepwise reduction. This has the result that, for the same quantities of electricity flowing through measuring resistor 31, the operation periods of pump 8 will take place at shorter and shorter intervals.

Activation of the reset circuit 34, which should take place in response to the switching operation of voltage sensitive switch 33 of monitoring circuit 4 can conveniently be arranged by the backward acting connection 6d from the output of monostable flipflop 12 to a differentiator 42, the output of which is furnished to reset circuit 34 over a further backward leading connection 6e. The flipflop 12, of course, is operated by the output of voltage sensitive switch 33 of monitoring circuit 4 over a connection 6a. Differentiating circuit 42 provides a reset trigger pulse suited for activating reset circuit 34 in response to the forward edge of the control pulse generated by flipflop 12.

In the example shown in the drawing, reset circuit 34 comprises a pnp transistor 43 and a discharge resistor 44, which together with the switching path between emitter 45 and collector 46 of the transistor 43 provide a series combination in shunt to feedback capacitor 36. The reset trigger voltage hence needs to produce a negative bias at the base 47 of transistor 43 with respect to the emitter 45 in order that the switching path 45–46 of transistor 43 will be put into conducting condition, so that the feedback capacitor 36 may discharge over this switching path 45–46 and the discharge resistor 44. In this manner, the integrated value generated by integrator 32 is canceled and monitoring circuit 34 is prepared to complete a further switching operation after a further flow of the particular specified quantity of electricity through measuring resistor 31.

The inductor 48 provides inductive energy storage and is interposed in the portion of load circuit 1 lying between electrically controllable switch 16 and load 3. In addition, capacitive storage is provided by capacitor 49 is connected in parallel with the load 3, so that inductor 48 and capacitor 49 are connected together at junction point 20. The series combination of storage inductor 48 and storage capacitor 49 is shunted by a reverse peak clipping diode 50 which has its anode grounded and its cathode connected to the common connection of electrically controlled switch 16 and storage inductor 48.

In order to provide the control voltage to the control input 18 of the electrically controlled switch 16 during operation of the system, a differential amplifier 51, preferably having at its output a voltage sensitive switch 52 is used. This voltage sensitive output switch 52 is connected so as to affect control circuit 18 of switch 16. Differential amplifier 51 has a positive signal input 53 and a negative signal input 54. The positive input 53 is connected to junction point 20 so that its potential will vary with the voltage across storage capacitor 49. On the other hand, negative signal imput 54 of differential amplifier 51 is connected to a stabilized potential, which in the illustrated example, is picked off from the junction 55 of two resistors 56 and 57 forming a voltage divider having one side grounded and the other side connected to the cathode of a Zener diode 58 the anode of which is grounded. Current is fed to Zener diode 58 from junction point 20 over a resistor 59, so that Zener diode 58 may maintain a steady potential at its cathode.

Electric motor 7 is coupled to the pump 8 by means of a magnetic coupling 60 indicated in the drawing by dashed lines. In order to obtain smooth running of the electric motor 7 and to provide jerking of the magnetic coupling 60, the control circuit 5 has a delaying circuit 61, provided in the illustrated case by a single capacitor, so that the voltage applied to the motor will rise gradually rather than suddenly.

In the circuit shown, the electric circuit 7 can be switched on and off by means of the switching path between emitter 62 and collector 63 of an npn transistor 64. Switching on of electric motor 7 occurs by means of the control pulse delivered to the control circuit 5 by monostable flipflop 12, over connections 6b and 6c and series connection of two resistors 65 and 66 to the base 67 of switching transistor 64, to provide a bias there which makes the switching path 62–63 of that transistor conducting and thus completes the operating circuit of the motor. The delay circuit 61 composed of a single capacitor is connected between the collector 63 of switching transistor 64 and the common connection point 68 of the two resistors 65 and 66, so that the switching path 62–63 will gradually become conducting and the full value of the supply voltage will be applied to electric motor 7 only when the capacitor constituting the delay circuit 61 has charged up.

The feed line 10, which contains the pump 8 driven by the electric motor 7, is connected with the individual cells 69 of the fuel cell battery 2 by individual branches 70, so that the fuel supplied to the individual cells 69 will have the same pressure and the same concentration. This advantageous type and method of fuel feed is feasible without the occurrence of disturbing losses from bridging of the individual cell 69 because in the present case the feeding of fuel occurs only at relatively large time intervals and then for relatively short duration.

A voltage supply bus 71 is connected to junction point 20 to provide supply voltage to branch supply busses of the various active stages of the system, to wit, supply conductor 72 of monostable flipflop 12, supply conductor 73 of first voltage sensitive switch 22, supply conductor 74 of second voltage sensitive switch 23, supply conductor 75 of regulator switch 24, supply conductor 76 of integrator 32, supply conductor 77 of voltage sensitive switch 33 of monitoring circuit 4 and supply conductor 78 serving differential amplifier 51 as well as voltage sensitive switch 52.

The system above-described has the following manner of operation. When the main switch 13 is closed, control voltage is released to differentiator 21 over conductors 19a and 19b. The output of differentiator 21 is applied to control input 18 of electrically controlled switch 16 over conductor 19c to put the switching path 14–15 of that switch into conducting condition. Voltage in consequence appears between junction point 20 and ground, so that current can flow in the circuit 1 through the load 3.

Differential amplifier 51, now supplied with voltage over branch supply bus 78, thereupon has such a potential difference between its inputs 53 and 54 that the voltage sensitive switch 52 operates and makes available the appropriate control voltage to the control input 18 of the electrically controllable switch 16 for maintaining the conducting condition of switching path 14–15. With increasing charge of storage capacitor 49, the potential difference between the inputs 53 and 54 will finally be so much changed that the voltage sensitive switch 52 will cut off the control voltage provided to control input 18 of switch 16, at which time the switching path 14–15 will become nonconducting. Because of the energy still present in storage inductor 48, the charge across storage capacitor 49 and accordingly the voltage between junction point 20 and ground will not be instantly reduced, but will gradually fall until the potential difference between the inputs 53 and 54 of differential amplifier 51 has again reached the point that the voltage sensitive switch 52 again switches to the control input 18 of switch 16 a control voltage necessary for establishing once more the conducting condition in switching path 14–15.

In the manner described above, it is possible to hold the voltage applied to the load 3 at a reasonably constant value with relatively low regulation losses.

When differentiator 21 is energized by the closing of main switch 3, the control voltage it produces is also furnished over connection 19d to initiate a control pulse of the monostable flipflop 12. This pulse is furnished over the connections 6b and 6c to the base 67 of transistor 64 of the control circuit 5 and puts the switching path 62–63 of transistor 64 into conducting condition. The electric motor 7, starting smoothly as the result of the effect of delay circuit 61, drives the pump 8 without slippage at its magnetic coupling. Fuel is then furnished from the supply tank 9 to the fuel cell battery 2 for the duration of the control pulse of monostable flipflip 12. The fuel suffers a reduction in concentration during its operation period in fuel cell battery 2 and flows back thereafter to storage tank 9 over return line 11.

The control pulse produced by monostable flipflop 12 in response to voltage over connections 19a, 19b and 19d upon closing of main switch 13 has the additional consequence that reset circuit 34 is activated over connections 6d and 6e to reset integrator 32, canceling any residual integration value that might be there. In this case also, the forward edge of the control pulse produces a reset trigger by means of differentiator 42 which temporarily drives the switching path 45–46 of transistor 43 into conducting condition, so that feedback capacitor 36 can discharge over this switching path 45–46 and discharge resistor 44.

During operation of the system, voltage sensitive switch 33 of monitor circuit 4 will be operated whenever a predetermined amount of electricity has flowed through measuring resistor 31. The control pulse produced by monostable flipflop 12 is in this case triggered over connection 6a by voltage sensitive switch 33 of monitoring circuit 4. This control pulse of flipflop 12, as just described, produces temporary activation of motor 7 of the pump 8 and resetting the output of integrator 32.

Since for every period of operation of the pump the concentration of the fuel is decreased, regulator switch 24 must help assure that even after a relatively long period of operation an amount of fuel is furnished from the tank 9 to the fuel cell battery 2 by each operation period of the pump which is electro-chemically at least approximately equivalent to a quantity of electricity that has flowed through measuring resistor 31. For this purpose, regulator switch 24 influences monostable flipflop 12 over backward acting connection 25 and/or influences monitoring circuit 4 over backward acting connection 38 in the manner previously described.

If the voltage made available by fuel cell battery 2 falls below a predetermined fixed value, which may happen after a very long period of operation, first voltage sensitive switch 22, responsing to the condition supplied to it over connections 19a and 19e will produce a signal over connection 19f to initiate a control pulse of monostable flipflop 12. This control pulse results in providing additional supply of fuel to fuel cell battery 2 in the manner already described and likewise a resetting of the output of integrator 32 of the monitoring circuit 4.

Before the voltage of fuel cell battery 2 reaches so low a value that the risk of damage is not to be excluded, a condition communicated over connections 19a and 19g to the second voltage sensitive switch 23 will cause that switch to produce a signal over connection 19h that puts the switching path 14–15 of electrically controllable switch 16 into nonconducting condition and thus for a longer period than in the case of regulation of differential amplifier 51. The load circuit 1 now remains interrupted at this switching path 14–15 until the main switch is opened and once again closed, because only then can the switching path 14–15 be put back into its conducting condition over conductors 19a, 19b and 19c. Since in the situation just mentioned, the junction point 20 and hence also the positive voltage bus 71 is completely bereft of voltage, no more supply voltage is received in this case by monostable flipflop 12 from its supply connection 72, by first voltage sensitive switch 22 from its supply connection 73, by second voltage sensitive switch 23 from its supply connection 74, by regulator switch 24 from its supply connection 75, by integrator 32 from its supply connection 76, by voltage sensitive switch 33 of the monitoring circuit 4 from its supply connection 77 and by differential amplifier 51 and voltage sensitive switch 52 from their supply connection 78. It is thus assured that once the switching path 14–15 of switch 16 is put in its nonconducting condition by second voltage sensitive switch 23, the entire system loses all voltage until the main switch 13 is opened and then closed again.

Although the invention has been described with respect to a specific example, it will be understood that variations may be made within the inventive concept without departing from the spirit of the invention.

We claim:

1. A voltage regulator system for a load circuit (1) energized by a fuel cell battery (2) comprising:
   a battery fuel storage tank (9);
   means including a pump (8) for supplying fuel from said tank to said battery;
   an electric motor (7) for driving said pump;
   control means (5) arranged to energize said electric motor;
   monitoring means (4) responsive to the current drawn by said load circuit and having an output switch (33) adapted to be switched from a rest condition to an operated condition whenever a particular specific quantity of electricity has passed through said load;
   a circuit connected to said battery (2) for supplying power to a load (3) including, in series, a main switch (13) between said battery (2) and said monitoring means (4), a measuring element (31) forming part of said monitoring means, and the switching path (14–15) of an electrically controllable switch (16);
   means for supplying a control voltage necessary to make said switching path (14–15) of said electrically controllable switch (16) conducting initially in response to the closing of said main switch (13) and to maintain said switching path conducting in response to the condition of the portion of said load circuit (1) on the load side of said electrically controllable switch (16), the voltage across said portion of said load circuit also serving as a supply voltage for activating elements of said monitoring means other than said measuring element thereof; and connecting circuit means for causing said control means to activate said motor every time said output switch is switched to its operated condition, to reset said output switch to its rest condition and after an interval to deenergize said motor, said connecting circuit means including a monostable flipflop (12) for producing control pulses, the duration of which determines the intervals during which said motor is energized and said pump is in operation.

2. A voltage regulator system as defined in claim 1 in which a differentiator (21) is provided, in which also said main switch (13) has an output providing a control signal to said differentiator when said main switch is closed and in which said differentiator is arranged to supply a differentiated control signal to said electrically controllable switch (16).

3. A voltage regulator system as defined in claim 1 in which the main switch (13) is interposed between said battery and said monitoring means, in which also a differentiator (21) is arranged to be supplied with a control voltage when said main switch is closed and in which an output of said differentiator (21) is connected to said flipflop (12) adapted to produce an initial control pulse of said flipflop (12) upon the closing of said main switch (13).

4. A voltage regulator system as defined in claim 2 in which said differentiator (21) is in effective connection with said electrically controllable switch (16) such that the output of said differentiator is adapted to supply control voltage to said electrically controllable switch for putting its said switching path (14-15) into conducting condition in response to the closing of said main switch (13).

5. A voltage regulator system as defined in claim 1 in which there is provided a first voltage sensitive switch (22) adapted to cause said flipflop (12) to produce a control pulse for actuation of said motor and said pump in the event the voltage supplied to said load circuit by said battery falls below a predetermined value.

6. A voltage regulator system as defined in claim 1 in which a second voltage sensitive switch (23) is provided, which is so connected as to cause said electrically controllable switch (16) to puts its switching path (14-15) into nonconducting condition when the voltage supplied by said battery to said load circuit falls to a value which is less than a predetermined voltage.

7. A voltage regulator system as defined in claim 5 in which a main switch (13) is interposed between said battery (2) and said monitoring means (4) and in which an electrically controllable switch is interposed between said monitoring means (4) and a load (3) in said load circuit (1) and in which a second voltage sensitive switch (23) is provided, which is adapted to put said electrically controllable switch (16) in nonconducting condition when the voltage supplied by said battery to said load circuit sinks below a predetermined value and in which said first voltage sensitive switch (22) and said second voltage sensitive switch (23) are so connected with said main switch (13) that a control voltage is made available to them as soon as said main switch (13) is closed.

8. A voltage regulator system as defined in claim 1 in which a compensating means (24) is interposed in the connection (6b, 6c) between said flipflop (12) and said control means (5) which is adapted to compensate for the decrease in fuel concentration by means of a switching operation after a predetermined number of pulses has been produced by said flipflop (12).

9. A voltage regulator system as defined in claim 8 in which said compensating means (24) is so connected (25) to said flipflop (12) that said switching operation of said compensating means (24) produces an increase in the duration of the control pulses thereafter produced by said flipflop (12).

10. A voltage regulator system as defined in claim 8 in which said compensating means (24) is so connected (38) to said monitoring means (4) that said switching operation of said compensating means is adapted to reduce said particular specific quantity of electricity the passage of which through said load circuit results in the operation of said output switch (33) of said monitoring means (4).

11. A voltage regulator system as defined in claim 1 in which said monitoring means (4) includes a measuring resistor (31) in series in said load circuit, in which further the voltage drop produced by the current through said measuring resistor is provided to an integrator (32), in which further said output switch (33) of said monitoring means (4) is a voltage sensitive switch responsive to the voltage varying with the integrated value as formed by said integrator (32) and adapted to switch to its operated condition when said varying voltage reaches a threshold value, in which further said particular specific quantity of electricity referred to in claim 1 is determined by said threshold value of said varying voltage, and in which a reset means (34) responsive to operation of said output switch (33) is provided in said monitoring means for resetting said integrator (32).

12. A voltage regulator system as defined in claim 11 in which said integrator (32) comprises an operational amplifier (35) having a feedback capacitor (36) connected between its output and its input and also connected over at least one series resistor (37) with said measuring resistor (31).

13. A voltage regulator system as defined in claim 11 in which a monostable flipflop (12) is provided in said connecting means and interposed in the connection (6a, 6b, 6c) between said monitoring means (4) and said control means (5) for producing control pulses the length of which determine the duration of periods of energization of said motor (7) and activation of said pump (8), and in which, further, reset control means (6d, 42, 6e) are provided which are adapted for enabling an output of said flipflop (12) to cause operation of said reset means (34) of said monitoring means (4).

14. A voltage regulator system as defined in claim 13 in which said reset control means (6d, 42, 6e) is so connected that the forward edge of a control pulse of said monostable flipflop (12) is adapted to cause operation of said reset means (34) of said monitoring means (4).

15. A voltage regulator system as defined in claim 1 in which inductive storage means (48) are interposed in a portion of said load circuit (1) between said electrically controllable switch (16) and said load (3) and in which also capacitive storage means (49) are provided in shunt with said load.

16. A voltage regulator system as defined in claim 15 in which a reverse kick clipping diode (5) is connected in parallel to the series combination of said inductive storage means (48) and said capacitive storage means (49).

17. A voltage regulator system as defined in claim 15 in which said control voltage for maintaining said electrically controllable switch (16) conducting in response to the condition of the portion of said load circuit between said electrically controllable switch (16) and said load (3) comprises a differential amplifier (51) the positive input (53) of which is supplied with a voltage varying with the voltage on said capacitive storage means (49) and the negative input (54) of which is supplied with a stabilized potential likewise energized by said capacitive storage means (49).

18. A voltage regulator system as defined in claim 17 in which said differential amplifier (51) has an output comprising a voltage sensitive switch (52).

19. A voltage regulator system as defined in claim 1 in which said control means (5) includes delay means (61) for delaying the rise of control voltage supplied to said motor and in which said motor is connected to said pump by a magnetic coupling (60).

20. A voltage regulator system as defined in claim 19 in which said pump is interposed in a fuel feed line (10) having a branched output (70) for supplying the individual cells (69) of said fuel cell battery (2).

21. A voltage regulator system as defined in claim 17 in which the supply voltage for said monitoring means (4), said control means (5), said connecting circuit means (6a, 12, 6b, 24, 6c) and other means (22, 23) interconnecting said main switch (13) and said connecting circuit means, as well as for said differential amplifier (51), is provided from the portion of said load circuit between said electrically controllable switch (16) and said load (3).

* * * * *